Dec. 31, 1940.   B. G. CARLSON   2,227,375
SERVOMOTOR SYSTEM FOR AIRCRAFT
Filed Nov. 26, 1938   5 Sheets-Sheet 2

INVENTOR
Bert G. Carlson
BY
Herbert H. Thompson
HIS ATTORNEY.

Dec. 31, 1940.     B. G. CARLSON     2,227,375
SERVOMOTOR SYSTEM FOR AIRCRAFT
Filed Nov. 26, 1938     5 Sheets-Sheet 3
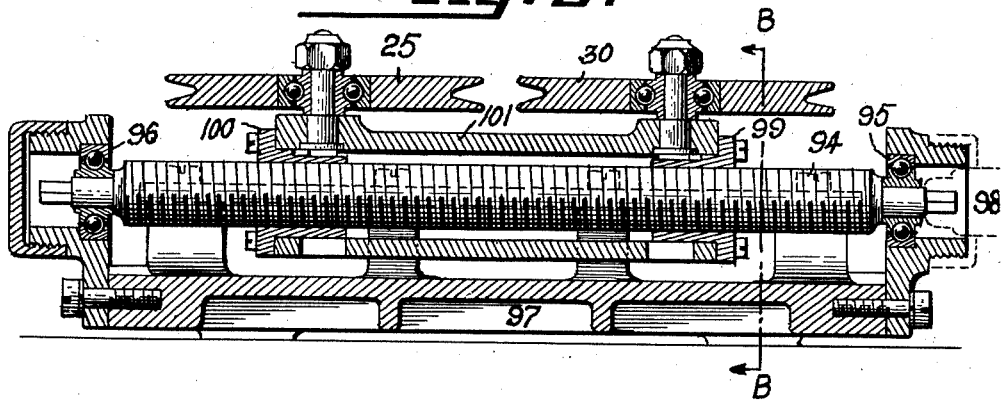
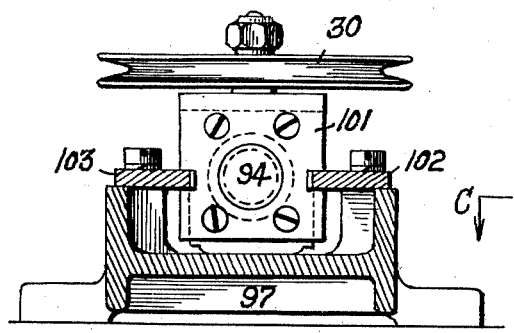
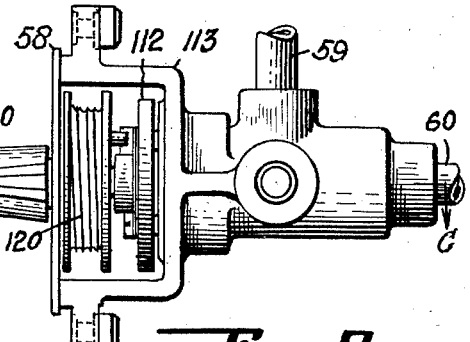
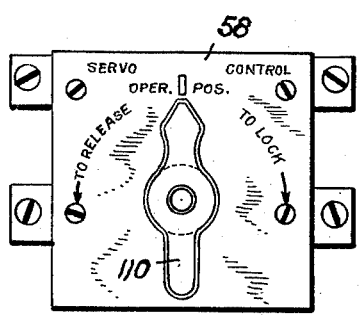
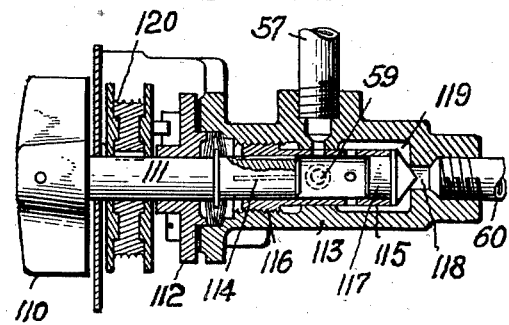
INVENTOR
Bert G. Carlson
BY
Herbert H. Thompson
HIS ATTORNEY.

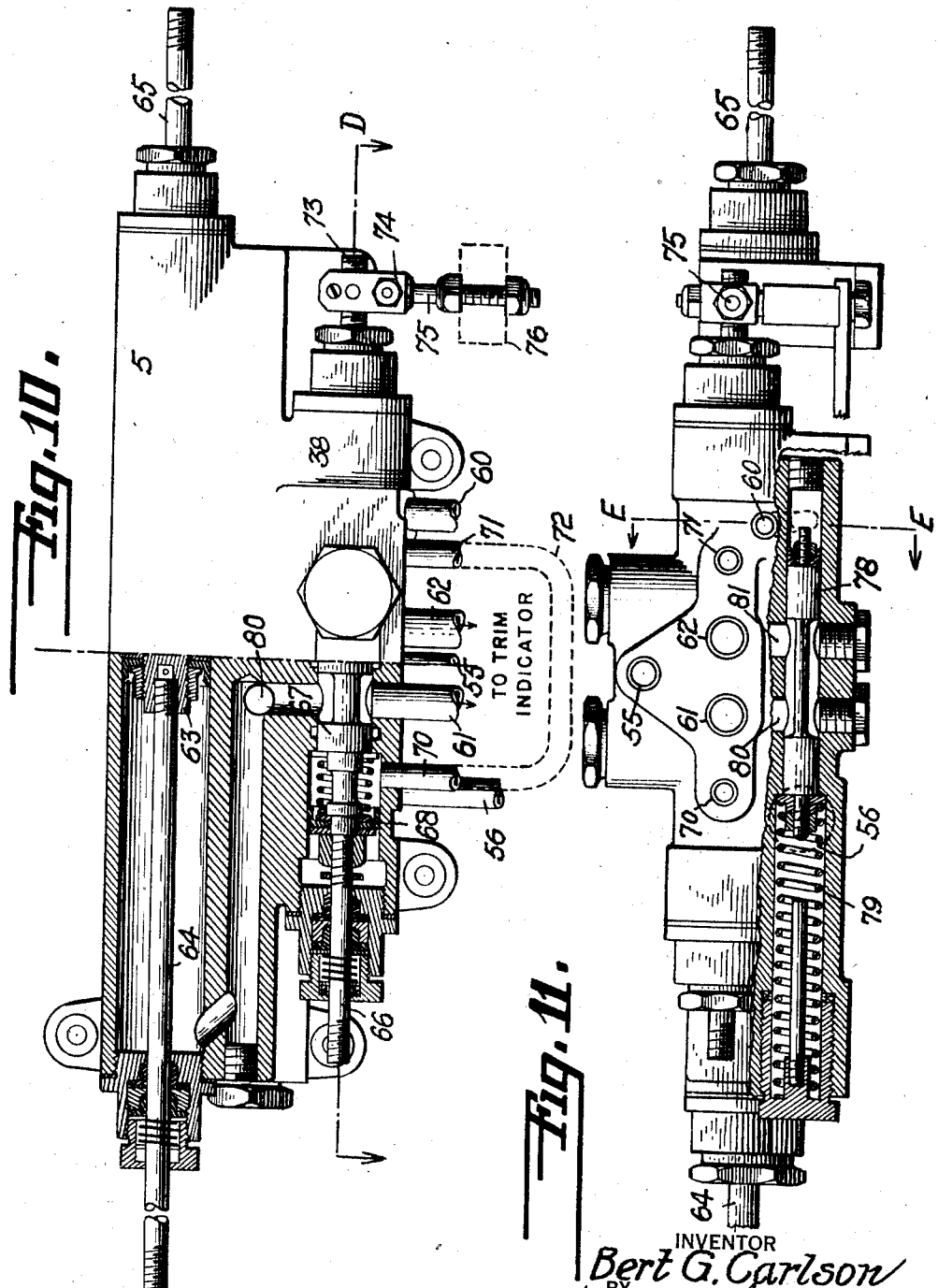

Dec. 31, 1940.  B. G. CARLSON  2,227,375
SERVOMOTOR SYSTEM FOR AIRCRAFT
Filed Nov. 26, 1938  5 Sheets-Sheet 5

INVENTOR
BERT G. CARLSON
BY Herbert H. Thompson
HIS ATTORNEY.

Patented Dec. 31, 1940

2,227,375

UNITED STATES PATENT OFFICE 2,227,375

SERVOMOTOR SYSTEM FOR AIRCRAFT

Bert G. Carlson, Freeport, N. Y., assignor to Sperry Gyroscope Company, Inc., Brooklyn, N. Y., a corporation of New York Application November 26, 1938, Serial No. 242,546

9 Claims. (Cl. 244—85)

This invention relates to steering devices for aircraft and, more particularly, to servo systems in which the power delivered to the control surfaces of the craft is produced in servomotors of considerable power output, so that the pilot of the ship is relieved of the strain associated with manually exerting enough power to overcome the reactions of the control surfaces.

One purpose of this invention is to provide a novel system by which such servo control can be easily and automatically actuated from the control stick or wheel handled by the pilot.

Another object of the invention is to provide means by which the pilot can actually feel the attitude of the ship while flying, even though the power to move the control surfaces is supplied by the servomotor.

A further object is the provision of a so-called servo control valve which enables the operator to either fly with the servomotor control or manually, or completely automatically from an automatic pilot and which has also a position in which the servomotor can be completely locked. This last condition is desirable when on the ground and while making adjustments.

I also provide a novel means of manually adjusting the trim tabs associated with some of the control surfaces of the ship in order to be able to compensate for changes of trim of the ship while in flight. I also provide an indicator by which the trim condition of the ship can be observed if the ship is steered by an automatic pilot.

In the drawings,

Fig. 5 is an elevation cross section of the trim tab control and equalizer.

Fig. 6 is a vertical cross section along the line B—B of Fig. 5.

Figs. 7 and 8 show two views of the servo control valve.

Fig. 9 is a vertical cross section through Fig. 8 along the line C—C.

Fig. 10 is a plan view, partly in cross section, of the servomotor.

Fig. 11 is another view of the servomotor with a cross section through the automatic by-pass valve.

Figure 1:
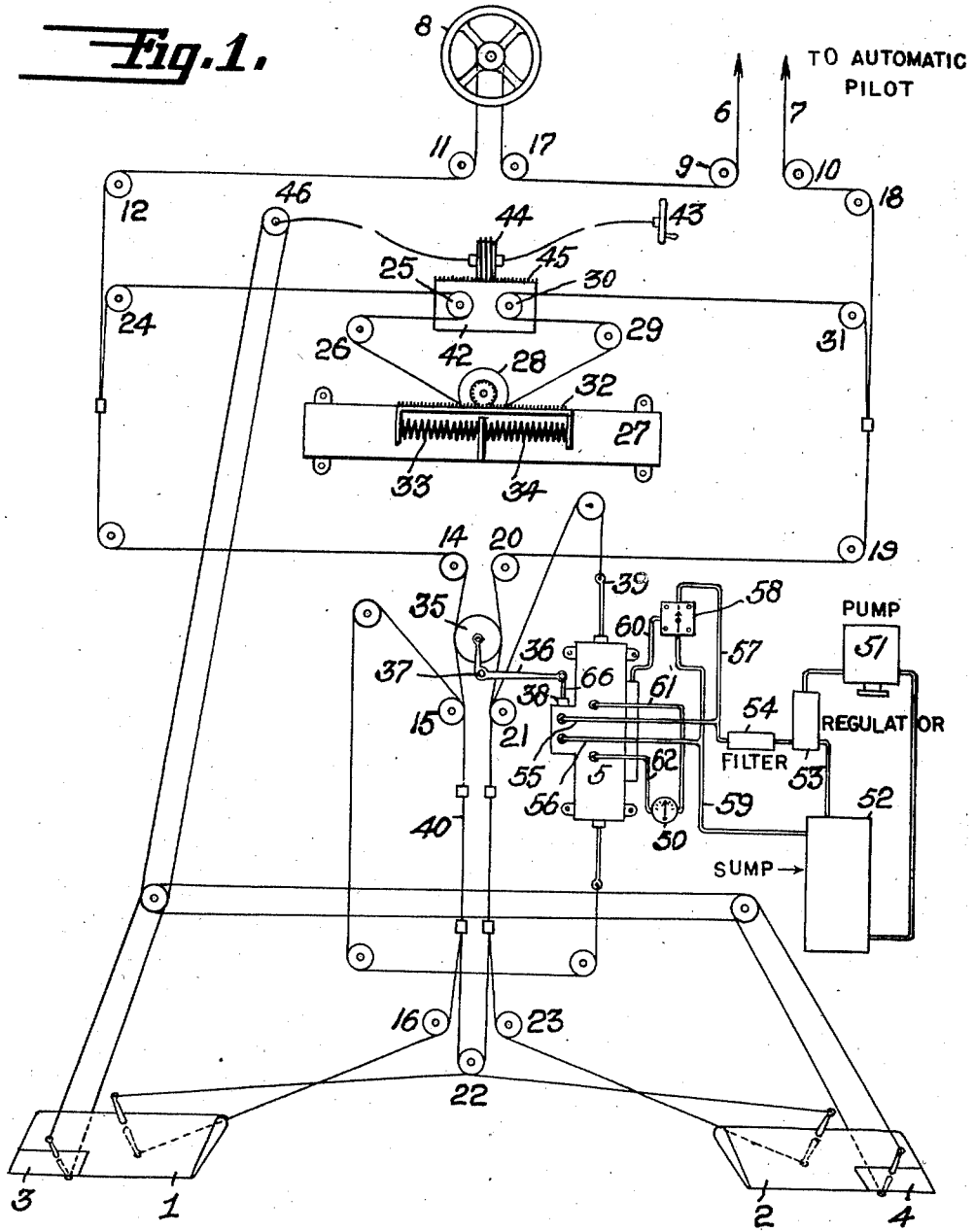
Fig. 1 shows a schematic diagram of my novel servomotor and trim control.

In Fig. 1, the control for only one pair of control surfaces is shown, in this case for the ailerons 1 and 2 by which the transverse positions of the ship is controlled. These ailerons are equipped with small independently movable surfaces 3 and 4, generally called trim tabs. The ailerons are controlled in opposite sense by means of a servomotor 5 through a system of cables and pulleys, and also can be controlled from an automatic pilot if the ship is equipped therewith, and which would enter into the system of control cables and pulleys through the cables 6 and 7. A third means of control is provided by the wheel 8 of the pilot, who, by turning this wheel, can produce the same effects as either the automatic pilot or the servomotor 5.

If, for the present, it is assumed that the craft is not equipped with an automatic pilot, so that cables 6 and 7 would be connected at the pulleys 9 and 10, then the primary impulses for the control of the ship would have to come from the pilot through the wheel 8. The main line of control cables from the wheel 8 leads over pulleys 11, 12, 13, 14, 15 and 16 to one side of aileron 1, and over pulleys 17, 18, 19, 20, 21 and 22 to the other side of aileron 1. Turning of the wheel 8 in one direction or the other will either lift or depress the aileron from its normal position, in which it is coplanar with the main wing surface. At the same time the same cables, one branch of which is led over pulleys 23 and 22, also control aileron 2 in opposite sense. A further effect of the pull exerted on the cables is caused by that part of the cable which runs over pulleys 24, 25 and 26 to the "stick feel" device 27, where it is wrapped several times around pulley 28 to return over pulleys 29, 30 and 31 to the return path of the cable on the other side of the wheel. Any turning of the wheel will turn pulley 28 and thereby move the rack 32 in one direction or the other, thereby tightening either spring 33 or 34.

If the pilot turns the wheel 8 in order to move the ailerons, for instance, in a clockwise direction, the part of the cable between pulleys 14 and 15 is tightened while another part of the cable between pulleys 20 and 21 is slackened at the same time. Consequently the differential pulley 35, which is mounted on a bell crank 36 pivoted at 37, will move clockwise and thereby actuate the control valve 38 of the servomotor 5. The servomotor will respond by moving its piston rod 39 in an upward direction, thereby taking over the load on cable 40 and allowing the pulley 35 to return to its normal posistion. As soon as this pulley has reached its neutral point, the control valve 38 is returned to its center position and no further motion of the servomotor will result. Therefore the servomotor, in connection with the pulley 35 and the valve 38, constitutes a follow-up or power booster system which will complete the action on the ailerons which was initiated by the wheel 8, and it will follow the motion of the wheel 8 as long as it is turned. If the wheel 8 stops turning, the servomotor will also stop and keep the ailerons locked in their last position by means of the hydraulic fluid trapped on each side of its piston.

As explained heretofore, the "stick feel" device 27 has also been actuated by the turning of the wheel, and as the same was turned clockwise, spring 33 has been tightened and spring 34 has been released, so that now there is acting on the wheel 8 the pressure of spring 33 trying to return the wheel to its normal position. This reaction is the only sensation which the pilot will feel, and if the device 27 would be eliminated from the assembly, the pilot would not be able to feel the familiar sensation of the air pressure on the ailerons which would normally react into his wheel, but which now is completely absorbed and balanced by the servomotor 5.

If, in normal flying, the trim of the ship should change along its transverse axis so that the ship would have the tendency to drop one wing, the pilot will react by winding up his wheel 8 until the ship is again on a level keel, but he would continuously feel the counteracting force of the springs in the "stick feel" device 27, reminding him all the time that the ship must be out of trim. I provide, therefore, means by which the pilot can manually compensate for the out-of-trim condition of the ship. This is accomplished by adjusting the trim tabs 3 and 4 in such a way as to overcome the continuously exerted air pressure on the control surfaces.

Inasmuch as the pilot will not be able to feel the change of air pressure on the surfaces after the trim tabs are adjusted, it is necessary to simultaneously adjust the "stick feel" device 27. I therefore provide an equalizer 42 which interconnects the trim tab control with the "stick feel" device. A handwheel 43, by means of a flexible shaft or other suitable means, is connected to a worm 44 which is mounted on the framework of the ship. A rack-controlled carriage 45 carries two pulleys 25 and 30 and will be shifted parallel to the axis of the worm if the worm is turned. Turning of the wheel 43 therefore will shift the two pulleys 25 and 30 with respect to the pulley 28 and cause rotation of that pulley. Also driven by the same handwheel 43 is a pulley 46 or other suitable device which, by means of cables or other well known means, is directly connected to the trim tabs 3 and 4. Therefore, while the handwheel 43 turns, the trim tabs are adjusted and the spring pressure in the "stick feel" device 27 is relieved, and the ratios of transmission of motion from the handwheel to the trim tabs and to the equalizer are chosen in such a way that the spring pressure is completely relieved at the same time at which the trim tabs relieve the back pressure on the ailerons. The wheel 8 now is in a neutral position as regards the spring pressures developed in the "stick feel" device and the pilot no longer feels what he by experience has been taught to analyze as the pressure resulting from the misalignment of the aileron surfaces.

If the ship is controlled by an automatic pilot, the necessity for the "stick feel" device 27 is eliminated, because the pilot does not handle the wheel 8 and therefore any spring pressure developed in the device 27 will be absorbed by the automatic pilot. If, however, an out-of-trim condition develops, a continuous pressure from the aileron surfaces will be present and this pressure will have to be taken up within the servomotor cylinder. The pressure resulting from the position in which the ailerons 1 and 2 have been held in order to compensate for the out-of-trim condition will react on the piston of the servomotor and cause a higher pressure on one side of the piston than on the other. This pressure is readily indicated by a trim indicator 50 which is directly connected to the oil passages leading to either side of the piston. This indicator is described in detail in my copending application, now Patent No. 2,171,265, dated August 29, 1939, for Aircraft trim indicator, and reacts only to continuous differential pressure; but not to the short pressure changes occasioned by the normal steering impulses delivered to the control surfaces. Therefore, during normal flight and when the ship is in trim, no indication will show on the face of this indicator. If an out-of-trim condition develops and persists, the indicator will gradually move its pointer over to show in which direction the trim tab should be adjusted, and the pilot, by observing the indicator, can move the handwheel 43 sufficiently to bring the pointer of the indicator 50 back to center.

The servomotor 5 receives its hydraulic energy from a pump 51 which draws oil out of a sump 52. A pressure regulator 53 maintains constant oil pressure in the system and a filter 54 removes impurities. Two oil lines 55 and 56 lead to the control valve 38, line 55 carrying pressure and line 56 being the return to the sump. The oil pressure also is led through a pipe 57 to a two-way valve 58 called the servo control valve, and which will lead the oil either through the by-pass to the return line 59, or through a line 60 into an automatic by-pass valve associated with the servomotor 5 as described in detail hereinafter.

The servomotor itself is shown in detail in Figs. 10, 11, 12, and 13. The oil lines 61 and 62 leading to the trim indicator 50 are shown in Fig. 10 as connected to the oil passages leading to either side of the piston 63. This piston has two rods 64 and 65, the ends of which in known manner are connected to the control cables for the steering surfaces. A valve rod 66 is connected to the bell crank 36 shown in Fig. 1, and controls the oil flow to the piston 63 by means of a slide valve in known manner, said valve being shown as having a pair of spaced pistons 67, 67' thereon. Provision has been made to operate this valve also by means of an auxiliary piston 68 on one side of the piston 67 and by a separate piston 69 on the other side of the opposite piston 67' (see Figs. 11 and 12). By admitting oil into the chamber between the valve body and these pistons through lines 70 and 71, it would be possible to move the valve through a relay valve controlled directly from the automatic pilot or through other suitable means. In the present embodiment, however, lines 70 and 71 are by-passed as shown by the dotted pipe 72. On the other side of the piston 67', a rod 73 projects from the valve housing and connects to a forked lever 74 carrying a stud 75, to which a weight 76 may be fixed in case the inertia of the bell crank 36 and the push-pull rod connection from the bell crank to the rod 66 is of appreciable value. This weight will eliminate unwanted motion of the valve due to vibrations or accelerations of the craft. In case the valve is operated hydraulically, the weight 76 is not used.

Figure 12:
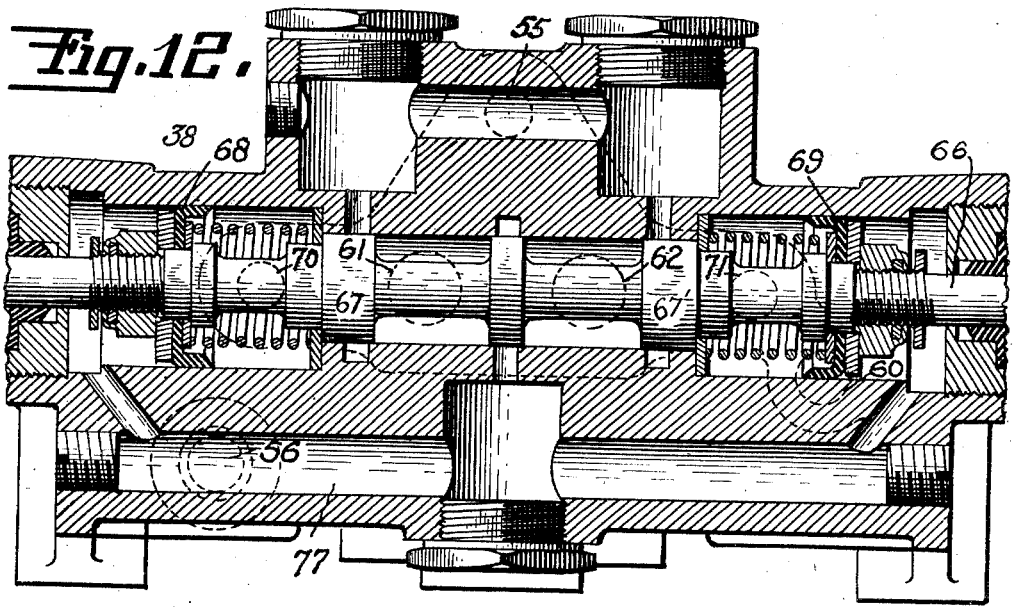
Fig. 12 shows a vertical cross section through Fig. 10 along line D—D.

Fig. 12 shows a cross section through the valve mechanism of the servomotor, the oil pressure entering through pipe 55, whence it is led to the valve proper. The return pipe 56 is connected to a passage 77 which collects leakage oil from behind the auxiliary valve pistons 68 and 69 from the main servo cylinder.

Fig. 11 shows in cross section how the automatic by-pass valve is arranged in the body of the servo motor. A valve stem 78 is under the influence of a spring 79, which tends to keep the valve in the position shown, in which the oil passages 80 and 81 are connected together so that no pressure can develop against the piston 63. If, however, oil pressure is introduced into line 60 through the valve 58, then the valve stem 78 is moved against the spring pressure into a position where it will block the passage 81, thereby eliminating the by-pass. Oil pressure now can be applied from the main valve to the piston for normal operation. This automatic by-pass valve is of great importance in case, for some reason, the oil pressure or the pump should fail during flight, so that the servomotor no longer would respond to the steering impulses given either by the pilot or by the automatic steering device. If no automatic by-pass valve were provided, the servomotor piston 63 might remain locked, preventing the pilot from manually moving the control surfaces. However, in the automatic by-pass valve the oil pressure also will disappear, allowing the spring 79 to move the valve stem 78 into the position where the by-pass is opened between oil passages 80 and 81, so that now the piston 63 is free to move either under the influence of the automatic pilot or through power exerted bodily by the pilot.

Figure 13:
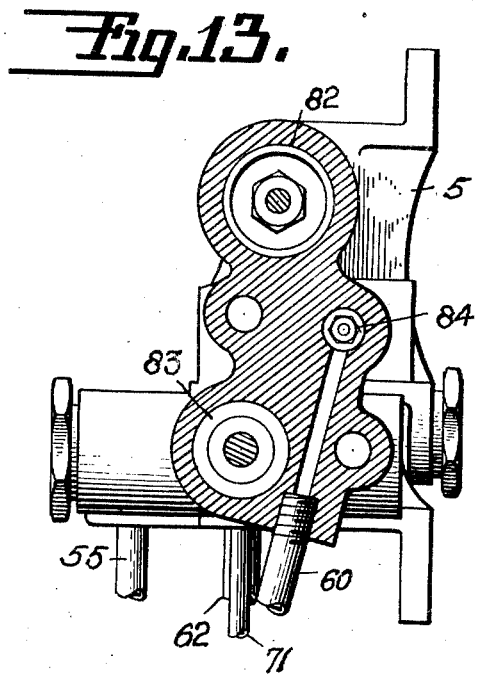
Fig. 13 is a cross section through the servomotor of Fig. 10 along line E—E.

Fig. 13 shows the relative location of the servo cylinder 82, the main control valve 83 and the automatic relief valve 84 within the body of the servomotor 5. This figure also shows how the oil lead 60 is connected to the automatic relief valve.

Figure 2:
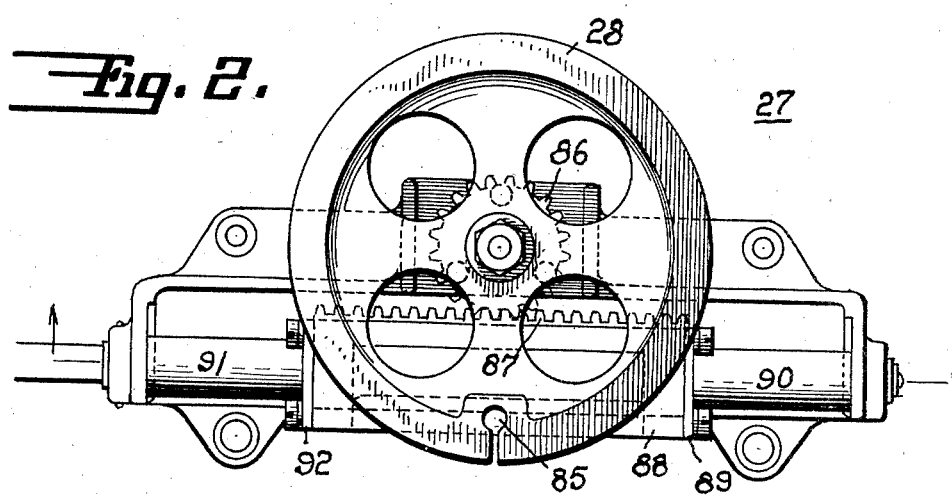
Fig. 2 shows an elevation of the "stick feel" device.
Figure 3:
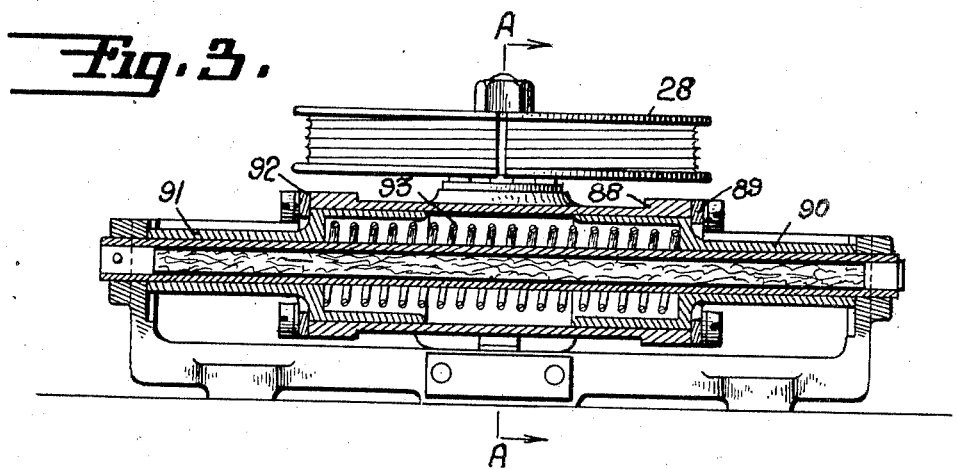
Fig. 3 is a plan view, partially in cross section, of the device shown in Fig. 2.
Figure 4:
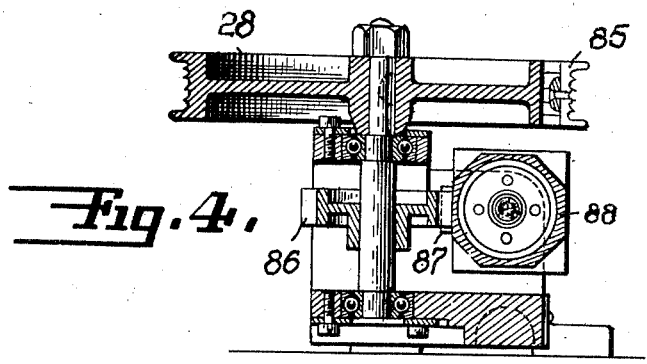
Fig. 4 is a vertical cross section through Fig. 3 along the line A—A.

The "stick feel" device 27 is shown in detail in Figs. 2 and 3. The pulley 28 is designed in such a way that the cable can be wrapped around the drum and be secured in a slot 85 so that it cannot slip. A pinion 86 is fastened to the drum pulley 28 and engages a rack 87 which is mounted on a sliding body 88. A ring 89 on this body engages a cylindrical tubular member 90 in such a way that only if the slider 88 moves to the left it will take along the member 90, but if it moves to the right, it will take along a similar member 91 by means of a ring 92. A spring 93 is located between the two members 90 and 91 and will be compressed no matter which of the members 90 or 91 is moved.

The equalizer, which serves the purpose of relieving the spring tension in the "stick feel" device described just above, is shown in Figs. 5 and 6 and consists mainly of a screw 94 journaled in bearings 95 and 96 mounted on a common base 97 and actuated from either end by means of a flexible shaft, the connection to which is shown in dotted lines at 98. Two nuts 99 and 100 are arranged on the screw and interconnected by a member 101 which is prevented from turning with the screw by two gibs 102 and 103 engaging suitable slots in the nuts 99 and 100. The member 101 carries the two pulleys 25 and 30, the action of which has been explained before. Rotation of the screw will move the member 101, together with the pulleys 25 and 30, either to the right or to the left, as the case may be.

The two-way servo control valve 58 is shown in Figs. 7, 8 and 9, of which Fig. 7 shows a front view of the face of the valve. The valve handle 110 can be moved into three positions, to "Release," "Operating position" and to "Lock." As shown in Fig. 9, the operating knob 110 is pinned to a shaft 111 journaled in a bearing plate 112, which is screwed to the valve body 113. The shaft 111 at its other end is provided with a series of splines 114, through which it is connected with a hollow member 115. This member has a threaded section 116 so that it can move along its axis while it is being turned. The spline connection between the member 115 and shaft 111 permits this motion without difficulty. The pressure oil enters the valve through line 57 and, in the position shown, enters into the inside of the member 115, from where it emerges through a series of holes into the cavity 119. The oil now, through the passage 118 and the pipe 60, enters the automatic relief valve on the servomotor to allow normal operation. If the handle 110 is turned in a clockwise direction, the member 115 is moved to the right until the conical tip 117 is pressed into the end of the member 115 closes passage 118, thereby locking the automatic relief valve in the normal operative position so that the servomotor piston cannot be moved at all, even if the pump 51 should be shut down. If the handle 110 is turned to the left, the passage 118 is opened again and the normal operative position is reached. Further turning to the left will close off the connection to the pressure pipe 57 and connect the line 60 to the return line 59, thereby removing pressure from the automatic by-pass valve. This valve will therefore now prevent operation of the servomotor and releases the pressure on both sides of its piston, enabling the pilot or the automatic steering device to control the ailerons direct.

Provision has been made for remote control of valve 58 by means of a pulley 120 also connected to the shaft 111, so that this valve can be operated from any suitable position in the ship.

Only the controls associated with one pair of control surfaces have been shown in Fig. 1. It is evident that by suitably duplicating the apparatus shown in Fig. 1, other surfaces could be controlled in a similar way.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a steering system for aircraft, a plurality of movable surfaces for controlling the direction of flight of said craft, a plurality of servomotors for moving said surfaces, a plurality of control valves for determining extent and direction of motion of said servomotors, means for actuating said valves in accordance with an initial steering impulse provided by the aviator, and normally balanced springs interposed between said aviator and said servomotor for exerting a force opposed to said impulse, whereby said aviator in overcoming said force feels a reaction comparable to the reaction felt in manual flying without servomotors.

2. In a steering system for aircraft having control surfaces, power operated servo means for moving said surfaces in accordance with initial steering impulses provided by the aviator, valve means responsive to said impulses for controlling the motion of said servo means, said valve and servo means forming a power follow-up system duplicating the aviator's control motions, and normally balanced spring means interposed between said aviator and said servo means for opposing said control motions with a force proportional to the magnitude of said motions, whereby said aviator in flying feels reactions to said motions comparable to reactions when flying manually without servomotors.

3. In a steering system for aircraft having a manual steering control means and control surfaces provided with trim tabs, a power follow-up system for duplicating the aviator's control motions, comprising a power servo means for moving said surfaces and a control valve operated by said control means and controlling said servo means, a normally balanced "stick feel" device interposed between said manual steering control means and said follow-up system, an equalizer for balancing said "stick feel" device, and manually operated means for simultaneously positioning said equalizer and said trim tabs, whereby out-of-trim conditions of said craft are compensated as said "stick feel" device is balanced.

4. In a servo control for a control surface of an aircraft, a master steering control for said surface, a reversible, normally locked, hydraulic servomotor actuated by said control and adapted to amplify the force exerted by said master control, a hydraulic pressure supply for said motor, a spring loaded automatic relief valve integral with said motor and normally held closed by said hydraulic pressure, said spring being adapted to unlock said motor upon failure of said supply, a manually operated valve for applying pressure to said relief valve in one position and for locking said relief valve in another position.

5. In a steering system for aircraft, a plurality of movable surfaces for controlling the direction of flight of said craft, a plurality of servomotors for moving said surfaces, a plurality of control valves for determining extent and direction of motion of said servomotors, means for actuating said valves in accordance with the motions of a master steering means, and a plurality of normally balanced springs interposed between said steering means and said servomotors for exerting forces opposed to said motions, said forces being substantially proportional to the resistance to movement normally offered by said surfaces.

6. In a steering system for aircraft, a movable surface for controlling the direction of flight of said craft, a servomotor for moving said surface, a control valve for determining the extent and direction of motion of said servomotor, a master steering means for actuating said valve, normally balanced springs interposed between said master steering means and said servomotor for exerting a force opposed to the impulses from said steering means, said force being substantially proportional to the resistance to movement offered by said surfaces.

7. In a servomotor power amplifier or follow-up system for a control surface of an aircraft equipped with a trim tab, a master steering control for actuating said servomotor system, a hydraulic zero center trim indicator, means for connecting said indicator to said servomotor and manually adjustable means connected to said trim tabs, whereby said indicator is kept centered by adjusting said trim tabs.

8. In a servo control as claimed in claim 4, a manually operated three position valve for applying pressure to said relief valve in one position, for locking said relief valve in another position, and for by-passing said pressure supply in a third position.

9. In a steering system for aircraft having a manual steering control means and control surfaces provided with trim tabs, a power booster system for assisting the aviator comprising a power servo means for moving said surfaces, a control valve operated by said control means and controlling said servo means, a normally balanced "stick feel" device interposed between said manual steering control means and said booster system, an adjustable equalizer for balancing said "stick feel" device, means for adjusting said trim tabs, and means operable thereby for readjusting said equalizer, whereby out-of-trim conditions of said craft are compensated as said "stick feel" device is balanced.

BERT G. CARLSON.